Dec. 22, 1970  I. M. GUROL  3,550,013

NOISE CANCELLING SYSTEM

Filed Jan. 10, 1969

INVENTOR.
Ismail Macit Gurol
BY
Barnard, McGlynn & Reising
ATTORNEYS

United States Patent Office 3,550,013
Patented Dec. 22, 1970

3,550,013
NOISE CANCELLING SYSTEM
Ismail Macit Gurol, Farmington, Mich., assignor to GSE Incorporated, Detroit, Mich., a corporation of Michigan
Filed Jan. 10, 1969, Ser. No. 790,273
Int. Cl. H03f 1/26
U.S. Cl. 328—1                    10 Claims

ABSTRACT OF THE DISCLOSURE

An amplifier circuit for signal generating transducers such as strain gages in which noise of various types is rejected. The signal generating transducer is connected to a power supply through a first switch. The output of the transducer is selectively connected through a second switch means to inputs of a difference amplifier. The first and second switch means are operated synchronously such that one difference amplifier input receives the sum of the transducer signal plus noise and the other difference amplifier input receives only noise. A filter connected to the amplifier output cancels any signal modulation due to the switching action.

---

Figure 1:
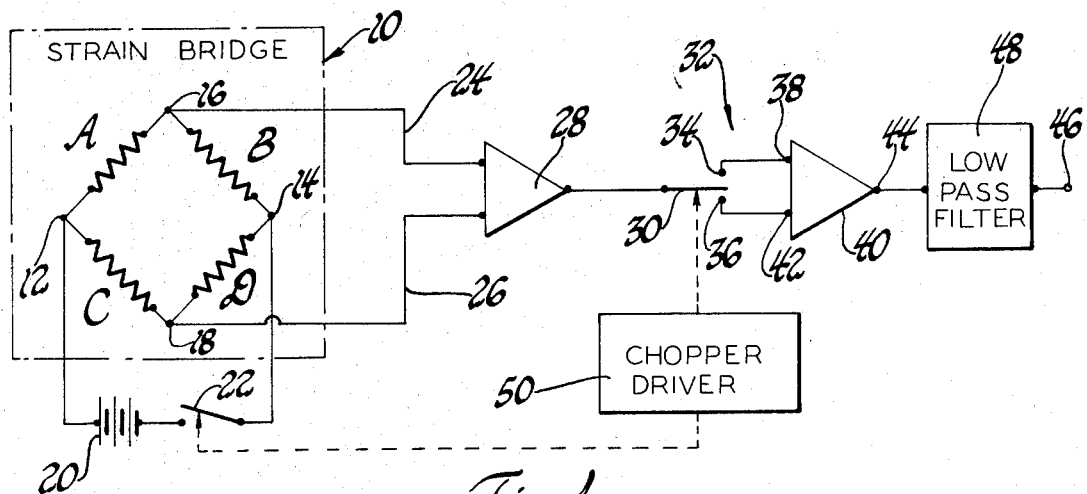

This invention relates to a transducer amplifier circuit and more particularly to a transducer amplifier circuit in which noise rejection is accomplished by connecting the transducer signal to opposite inputs of a difference amplifier and synchronously therewith switching the transducer power supply in and out of operative connection with the transducer.

In the operation of a low amplitude signal generating device such as a strain sensitive transducer, it is important to supress or reject electrical noise so that the low amplitude signal is not lost in the interfering noise. The need for noise rejection is particularly acute where the accuracy and sensitivity of the transducer device are very high and thus permit the measurement of extremely small input quantities.

Noise in electronic circuits may arise out of various phenomena and accordingly different approaches must ordinarily be taken to reject or suppress various types of noise. For example, common mode noise may arise out of a stray capacitance between an amplifier lead and ground. In addition, normal mode noise may arise out of a voltage or potential which occurs between two adjacent lead lines. Such normal mode noise is not referenced to ground and cannot ordinarily be rejected or suppressed by the same means which can be used to reject common mode noise. Finally, but not exhaustively, noise may be thermally induced in various electronic components resulting in spurious signals, amplifier drift and other phenomenon which are deleterious to input signal quantity measurement.

In accordance with the present invention, an amplifier circuit for signal generating devices, such as transducers, having external power supplies is provided in which all of the aforementioned noise quantities are effectively rejected. In general, this is accomplished by alternately applying the output signal from the transducer to opposite inputs of a difference measuring device for respective time periods. In addition, the transducer power supply is effectively connected and disconnected from the transducer itself synchronously with the difference amplifier input switching process.

In a preferred form of the invention, which may be advantageously applied to highly sensitive strain measuring transducers, the amplified output of the strain sensitive transducers is applied to opposite inputs of a difference-measuring amplifier and synchronously therewith a switch, such as a transistor, interconnecting the strain sensitive transducer and its power supply is alternately conditioned between conductive and non-conductive states. So operated, the preferred embodiment of the invention results in the application to one input of the difference amplifier of a signal quantity from the transducer together with the sum of noise components generated in the circuitry. The other input of the amplifier has applied thereto only the noise components. Accordingly, the output of the amplifier is a signal representing only the quantity being monitored by the transducer.

Figure 2:
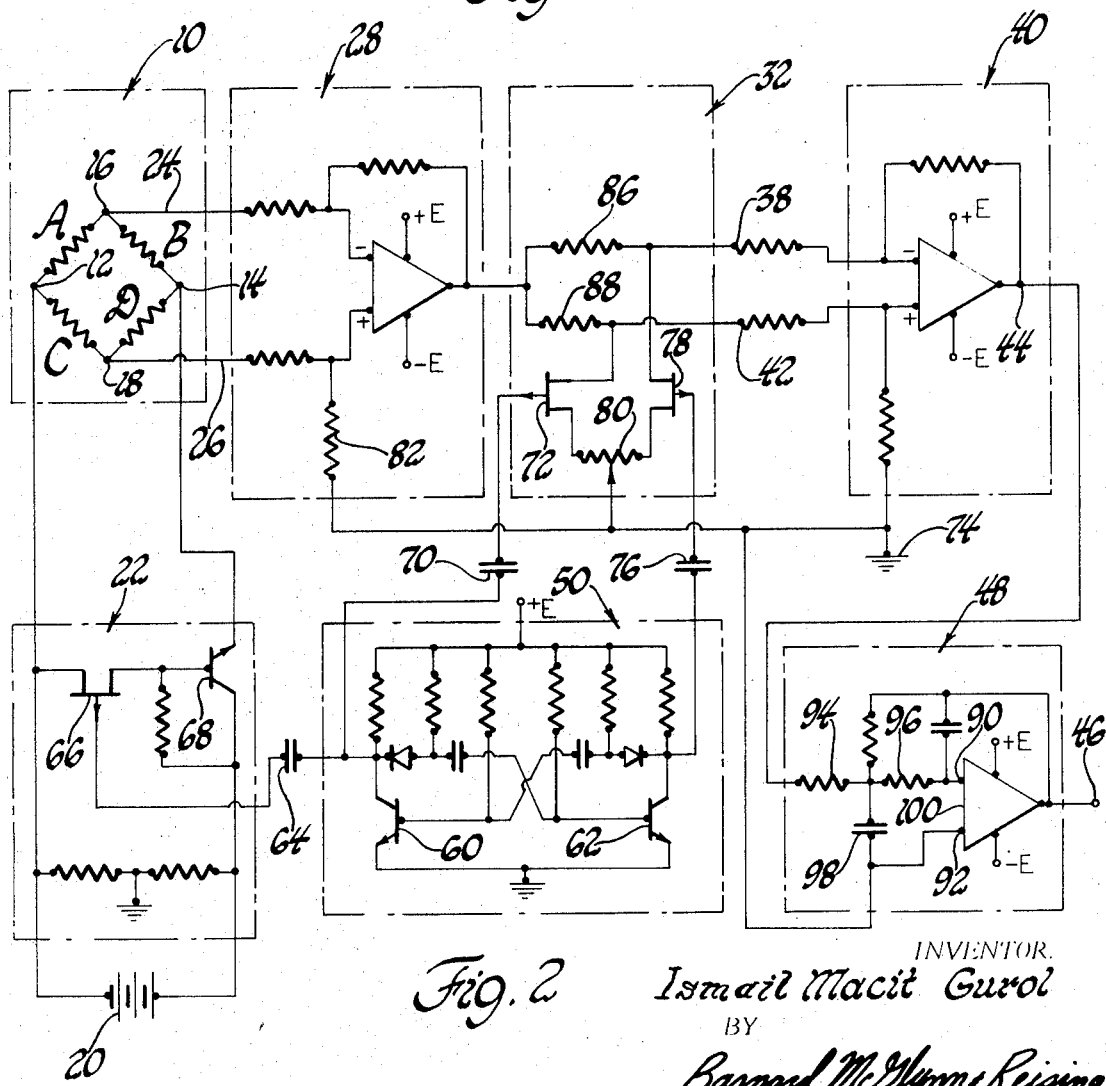

The various advantages of the invention will be made more apparent in the following specification which is to be taken with the accompanying drawings of which:

FIG. 1 is a block diagram of a preferred form of the invention as applied to strain gage bridges; and FIG. 2 is a schematic circuit diagram showing the components of FIG. 1 in greater detail.

Referring now to FIG. 1, a signal generating transducer 10 in the form of a strain gage bridge has input terminals 12 and 14 and output terminals 16 and 18. A power supply 20 in the form of a small DC battery is connected across power input terminals 12 and 14 through a single pole externally controllable switch 22.

As will be apparent to those skilled in the art, the arms A, B, C, and D of strain gage bridge 10 may be resistors of which one or more may be variable in response to the application of a force producing a strain in the support body carrying the bridge arm. Such strain varies one or more of the resistors defined by bridge arms A, B, C, and D thus unbalancing the bridge 10 and producing a signal across output terminals 16 and 18 which represents the applied force or a component thereof. The strain gage bridge 10 may be constructed to be extremely sensitive to applied forces and thus when small force measurements are made a comparatively low amplitude signal may be developed across the output terminals 16 and 18 as a result of bridge unbalance. Any signal developed across output terminals 16 and 18 is connected by way of conductive leads 24 and 26 to a low level DC amplifier 28 which increases the amplitude of the signal quantity from bridge 10.

The output of amplifier 28 is shown in FIG. 1 to be connected to the movable contact 30 of a signal chopper 32. Chopper 32 also includes two opposite stationary contacts 34 and 36 which may be alternately engaged by the movable contact 30 as dictated by an external control device as will be hereinafter described. Stationary contact 34 is connected to input 38 of a difference-measuring amplifier 40. Similarly, stationary contact 36 is connected to another input 42 of the amplifier 40. This amplifier 40 is of the type producing a signal on output 44 which represents the absolute difference between the signal quantities alternately applied to the inputs 38 and 42. The output 44 of amplifier 40 may be connected to a circuit output terminal 46 through a low pass filter 48, the function of which is to eliminate from the output signal from amplifier 40 any modulation effect due to the switching action of elements 22 and 32. To this end, the cutoff frequency of filter 48 is well below the frequency of switching employed in elements 22 and 32.

The switching function of chopper 32 as well as the switching function of single pole switch 22 is controlled by means of a chopper driver 50. Chopper driver 50, which is more fully described in FIG. 2, is operative to control the conductive and non-conductive conditions of single pole switch 22 in synchronism with the alternate displacement of movable contact 30 in chopper 32. Specifically, the driver 50 urges movable contact 30 into engagement with stationary contact 34 at the same time switch 22 is placed in a conductive condition thus applying DC power from source 20 across the power input terminals 12 and 14 of bridge 10. Similarly, movable contact 30 is engaged with stationary contact 36 while switch 22 is rendered non-conductive. Thus, the amplifier 40 receives during the first portion of an input signal cycle the combination of the bridge output signal developed across terminals 16 and 18 together with any noise generated in the electrical circuitry including bridge 10 itself, the amplifier 28, and the amplifier 40. During the second portion of an input signal cycle, the amplifier 40 receives only the noise signal generated in the circuit. Under ordinary circumstances, the time periods established by chopper driver 50 during which the movable contact 30 of chopper 32 engages the stationary contacts 34 and 36 are equal. Similarly, since switch 22 is operated in synchronism with chopper 32, the power supply 20 is connected to and disconnected from input terminals 12 and 14 of bridge 10 for equal time periods. The result is an output signal from the amplifier 40 which represents the absolute difference between the signal plus noise applied to input 38 and the noise alone which is applied to input 42.

It is apparent that common mode or ground reference noise may be induced by outside sources of interference producing stray capacitances between the lead lines of the circuitry shown in FIG. 1 and ground. Since such common mode noise exists on the average during both halves of the cycle of chopper 32 and switch 22, the common mode noise is applied to both inputs 38 and 42 of difference-measuring amplifier 40. Accordingly, common mode noise is effectively rejected by the amplifier 40. Similarly, normal mode noise such as a floating potential induced between lead lines 24 and 26 is also applied in an amplified form to both inputs 38 and 42 of amplifier 40. Accordingly, normal mode noise is also rejected by the difference-measuring action. Finally, but again not exhaustively, thermally induced noise such as a drift effect in amplifier 28 on a thermally induced voltage of a random nature across the output terminals 16 and 18 of bridge 10 will also be applied to both input terminals 38 and 42 of the amplifier 40. Accordingly, the signal difference-measuring function of the amplifier 40 is effective to reject this form of noise. Since the power supply 20 is applied to the bridge 10 only during half of the cycle produced by chopper driver 50, the noise signal applied to input 42 is entirely free of intelligence and the difference measuring results in a highly purified intelligence signal on the output terminal 46.

It will be obvious that the switching action represented in FIG. 1 by switch 22 as well as the switching action of the chopper 32 may be best accomplished by non-mechanical solid state electronics. A circuit indicating such an embodiment of the switching means is shown in FIG. 2.

In FIG. 2, the schematically represented components are arrayed in blocks corresponding to the blocks of FIG. 1 and are correspondingly numbered. Accordingly, a description of the overall circuit design will not be repeated. Chopper driver 50 comprises a free-running multivibrator having cross-coupled NPN type complementary transistors 60 and 62. The chopper driver, which may be designed to have a switching frequency of 5 kc., controls the operation of the source switch 22 and the synchronous chopper 32 by controlling the voltage applied to the gates of field effect transistors as is more fully described hereinafter.

More particularly, the collector of transistor 60 is connected through a coupling capacitor 64 to the gate of a P-type field effect transistor 66 which forms part of the circuit of source switch 22. Field effect transistor 66 is in turn connected to the base electrode of a NPN transistor switch 68, the collector and emitter electrodes of which form a series circuit between the power supply 20 and the input terminals 12 and 14 of bridge 10. Accordingly, transistor switch 68 is alternately switched between conductive and non-conductive states at the same frequency with which multivibrator transistor 60 switches between conductive and non-conductive states.

The collector electrode of multivibrator transistor 60 is also connected through a coupling capacitor 70 to the gate of a P-type field effect transistor 72, the primary electrodes of which are connected between the non-inverting input 42 of amplifier 40 and ground 74. In a corresponding fashion, the collector of complementary multivibrator transistor 62 is connected through a coupling capacitor 76 to the control or gate electrode of a P-type field effect transistor 78, the primary electrodes of which are connected between the inverting input 38 of amplifier 40 and ground 74. Thus, alternately conductive transistors 60 and 62 control the conductivity of field effect transistors 72 and 78 to alternately connect the output of amplifier 28 to the inputs 38 and 42 of the difference-measuring amplifier 40. A potentiometer arrangement 80 may be connected between the field effect transistors 72 and 78 and ground for balancing purposes.

In operation, a strain input to transducer 10 produces a signal across the output terminals 16 and 18 representing the strain input. This output signal is applied across the positive and negative inputs of the low level differential amplifier 28. The positive input of amplifier 28 is connected to ground 74 through a larger resistor 82. Suitable supply voltages of opposite polarity but equal amplitude may be supplied to the differential amplifier 28 by way of the ground referenced dual power supply arrangement. The output of amplifier 28 representing the potential difference across the inputs thereof is connected to the inputs 38 and 42 of difference amplifier 40 through resistors 86 and 88, respectively. The particular input as between 38 and 42 to which the output of amplifier 28 is effectively applied depends upon the conductive states of field effect transistors 72 and 78 as previously described. With field effect transistor 72 conductive, the signal as applied to input 42 is shunted to ground 74 and thus the output of amplifier 28 is effectively applied only to the difference amplifier input 38. In a similar fashion when field effect transistor 78 is conductive to ground, the signal from differential amplifier 28 is effectively connected only to input 42.

Describing the operation of the circuit of FIG. 2 in greater detail, when multivibrator transistor 60 is cut off, a positive-going bias signal is applied to the gate electrodes of field effect transistors 66 and 72. The positive-going signal presents a reverse bias to the field effect transistor 66 causing the circuit between the primary electrodes to appear as an infinite impedance. This forward biases source switch transistor 68 rendering it conductive and applying the source 20 to the power input terminals 12 and 14. In this state, bridge 10 presents an output signal to amplifier 28 representing intelligence and any noise arising in the bridge 10.

The positive going signal applied to the gate of field effect transistor 72 also reverse biases that transistor and renders it non-conductive. Since transistors 60 and 62 operate in a complementary fashion, field effect transistors 72 and 78 also operate in a complementary fashion. Accordingly, with full effect transistor 72 reverse biased, transistor 78 is forward biased, grounding input 38 of amplifier 40. The output from amplifier 28 containing both signal and noise is thus applied only to non-inverting input 42 of amplifier 40.

When chopper driver 50 changes state, transistor 60 becomes conductive and transistor 62 becomes non-conductive. This applies a negative going voltage to field effect transistors 66 and 72 and a positive going voltage to field effect transistor 78. Accordingly, transistors 66 and 72 are rendered conductive and transistor 78 is rendered non-conductive.

With transistor 66 conductive, source switch transistor 68 is cut off, disconnecting the source 20 from the bridge terminals 12 and 14. Accordingly, any voltage appearing at the output of amplifier 28 represents noise generated in the circuitry.

With transistor 72 conductive, input 42 is effectively grounded through the shunt path including field effect transistor 72. Therefore, any output from amplifier 28 is applied only to inverting input 38 of amplifier 40. As previously stated, this output represents only noise generated in the circuitry and may be common mode, normal mode, or thermally induced noise.

Since amplifier 40 is equipped with inverting and non-inverting inputs, an algebraic addition function is employed to obtain the difference between the input voltages applied to inputs 38 and 42. The difference signal thus represents the intelligence plus noise applied to input 42 minus the noise alone applied to input 38 which, of course, is the intelligence alone.

The intelligence appearing on output 44 of amplifier 40 is applied to a filter 48 which removes modulation due to the switching action of switch 22 and chopper 32. The filter includes a difference measuring stage 100 similar to that of amplifier 48 and having inverting and non-inverting inputs 90 and 92, respectively. The non-inverting input 92 is grounded as shown. The inverting input 90 is connected through resistors 94 and 96 to the output 44 of amplifier 40. A capacitor 98 shunts any high frequency signal components to ground. The output of the differencing stage 100 is connected not only to circuit output terminal 46 but also through an RC feedback network including resistors 96 and 102 and capacitor 104 to smooth the output and remove the switching modulation component. The effective cutoff frequency of filter 48 may be made approximately 500 c.p.s. which is well below the 5 kc. switching frequency produced by chopper 50.

It is to be understood that the foregoing description is illustrative in nature and is not to be consstrued in a limiting sense.

The embodiments of the invention in which an exclusive property or privilege is claimed are defined as follows:

1. Noise suppressing amplifier apparatus comprising: a power supply; a transducer having a power input and a signal output; first switch means interconnecting the power supply and the power input and having conductive and non-conductive states; amplifier means having two inputs and an output, said amplifier means producing a signal on said output related to the difference between the quantities applied to the inputs thereof; second switch means for selectively and alternately connecting the transducer output to each of said inputs; and control means for synchronously operating the first and second switch means to connect the transducer output to one of said inputs when said first switch means is conductive and to connect the transducer output to the other of said inputs when said first switch means is non-conductive.

2. Noise suppressing amplifier apparatus as defined in claim 1 further including filter means connected to said output for rejecting signals having a modulation frequency at or above the frequency of operation of said last mentioned means.

3. Noise suppressing amplifier apparatus as defined in claim 1 wherein said transducer is a strain-responsive bridge for modulating said power supply in accordance with mechanical loads applied thereto.

4. Noise suppressing amplifier apparatus comprising: a source of unidirectional electrical potential; a transducer having a power input and an output; first switch means connecting the source to the power input and having conductive and non-conductive states; difference amplifier means having two inputs and an output, said difference amplifier means producing a signal on said output related to the difference between the signals applied to the inputs; second switch means for selectively and alternately connecting the transducer output to each of said inputs; and control means for synchronously operating the first and second switch means thereby to connect the transducer output to one of said inputs when said first switch means is conductive and to connect the transducer output to the other of said inputs when said first switch is non-conductive.

5. Noise suppressing amplifier apparatus as defined in claim 4 further including filter means connected to said output for rejecting signals having a modulation frequency at or above the frequency of operation of said last mentioned means.

6. Noise suppressing amplifier apparatus as defined in claim 5 further including intermediate amplifier means connected between said output of said transducer and said second switch means.

7. Noise suppressing amplifier apparatus as defined in claim 5 wherein said control means places the first and second switch means in opposite conditions for equal time periods.

8. Noise suppressing amplifier apparatus comprising: a power supply; a strain gage bridge having two power input terminals and two signal output terminals; first switch means interconnecting the power supply and said power input terminals and having conductive and non-conductive states; DC amplifier means connected across said signal output terminals for producing an output signal quantity representing the voltage across said signal output terminals; difference amplifier means having two inputs and an output and adapted to produce a signal on said output related to the difference between the quantities applied to said inputs; means connecting the output of said DC amplifier to the inputs of said difference amplifier; means for selectively and alternately disabling said inputs including second and third switch means connected between respective inputs and ground; and control means for synchronously operating the first, second, and third switch means including a free-running bistable device having first and second complementary stages, the first stage being operatively connected to the first and second switch means to simultaneously control the conductivity thereof, said second stage being connected to said third switch means to control the conductivity thereof.

9. Noise suppressing amplifier apparatus as defined in claim 8 wherein said first and second complementary stages are operative for equal time periods.

10. Noise suppressing amplifier apparatus as defined in claim 8 further including filter means connected to the output of said difference amplifier means for rejecting signal components at the frequency of operation of said bistable device.

References Cited

UNITED STATES PATENTS

| | | | |
|---|---|---|---|
| 2,970,276 | 1/1961 | Dollinger | 330—514X |
| 3,308,383 | 3/1967 | Kinoshita et al. | 330—9X |
| 3,375,457 | 3/1968 | Hollstein | 330—9X |

FOREIGN PATENTS

| | | | |
|---|---|---|---|
| 1,011,936 | 4/1952 | France | 330—9 |

ROY LAKE, Primary Examiner

JAMES B. MULLINS, Assistant Examiner

U.S. Cl. X.R.

307—251, 308; 330—51, 149